(12) United States Patent
Miyazawa

(10) Patent No.: US 8,134,646 B2
(45) Date of Patent: Mar. 13, 2012

(54) VIDEO SIGNAL PROCESSING DEVICE AND VIDEO SIGNAL PROCESSING METHOD

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1300 days.

(21) Appl. No.: 11/802,678

(22) Filed: May 24, 2007

(65) Prior Publication Data

US 2008/0018795 A1    Jan. 24, 2008

(30) Foreign Application Priority Data

May 24, 2006  (JP) ................ P2006-144129
May 30, 2006  (JP) ................ P2006-150568

(51) Int. Cl.
*H04N 5/208* (2006.01)

(52) U.S. Cl. .................................. 348/625

(58) Field of Classification Search .......... 348/625, 348/627, 607, 609, 611, 614, 618, 666, 533–534
See application file for complete search history.

(56) References Cited

U.S. PATENT DOCUMENTS

| | | | | |
|---|---|---|---|---|
| 4,827,342 A * | 5/1989 | Ohta et al. | .............. | 348/622 |
| 5,912,702 A * | 6/1999 | Sudo | .............. | 348/234 |
| 6,597,407 B1 * | 7/2003 | Taketani et al. | .............. | 348/625 |
| 7,319,496 B2 * | 1/2008 | Uchida et al. | .............. | 348/625 |
| 7,580,024 B2 * | 8/2009 | Kamimura | .............. | 345/102 |
| 7,689,050 B2 * | 3/2010 | Sakaue | .............. | 382/239 |
| 7,808,473 B2 * | 10/2010 | Kamimura | .............. | 345/102 |
| 2006/0045374 A1 * | 3/2006 | Kim et al. | .............. | 382/255 |
| 2006/0256224 A1 * | 11/2006 | Kitaura | .............. | 348/333.01 |

FOREIGN PATENT DOCUMENTS

| | | | |
|---|---|---|---|
| JP | 11-032236 | | 2/1999 |
| JP | 2004-159148 | | 6/2004 |
| JP | 2005-175735 | | 6/2005 |
| JP | 2006-033469 | | 2/2006 |
| JP | 02006080767 | * | 3/2006 |
| JP | 2007-318313 | | 12/2007 |

OTHER PUBLICATIONS

Japanese Office Action dated Feb. 15, 2011 for JP-2006-144129.
Japanese Office Action dated Feb. 15, 2011 for JP-2006-150568.

* cited by examiner

*Primary Examiner* — Paulos Natnael
(74) *Attorney, Agent, or Firm* — Pillsbury Winthrop Shaw Pittman, LLP

(57) ABSTRACT

According to one embodiment, a video signal processing device includes an input unit to which a brightness signal is input, a high band emphasis unit that extracts a first high band component from the brightness signal and outputs an output signal by adding the first high band component to the brightness signal, an acquisition unit that acquires a first histogram data of brightness levels for one frame of the input brightness signal, and a first processing unit that performs a high band emphasis processing on the input brightness signal based on the first histogram data.

19 Claims, 8 Drawing Sheets

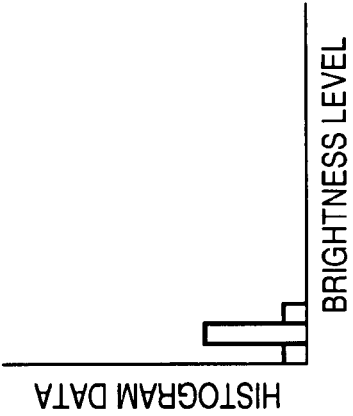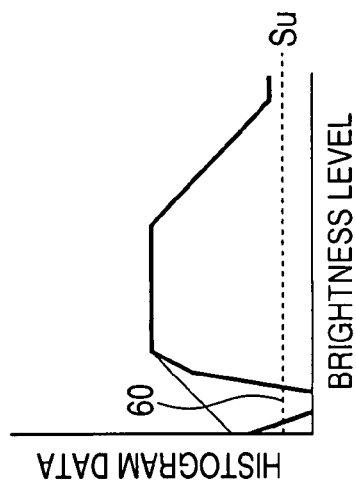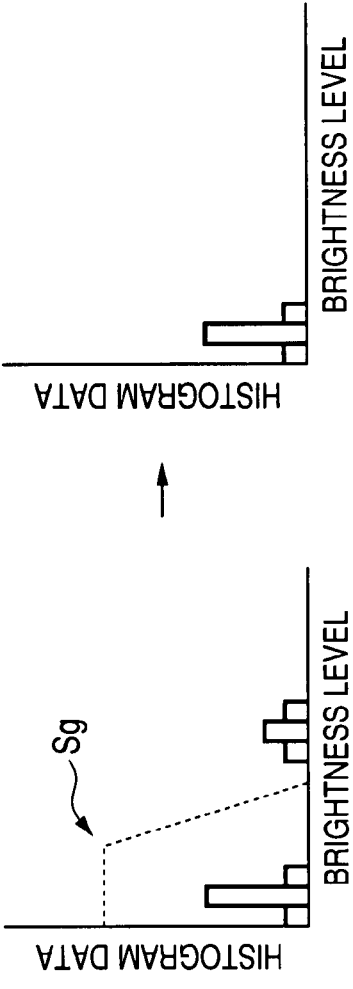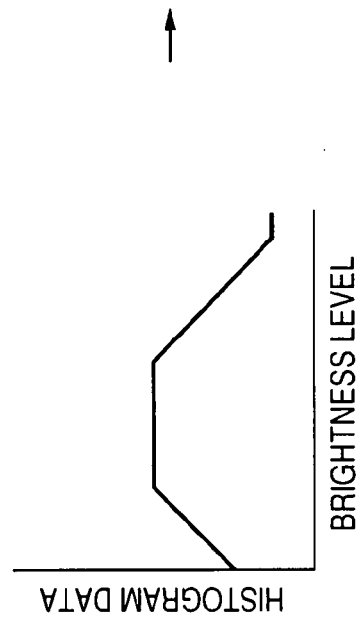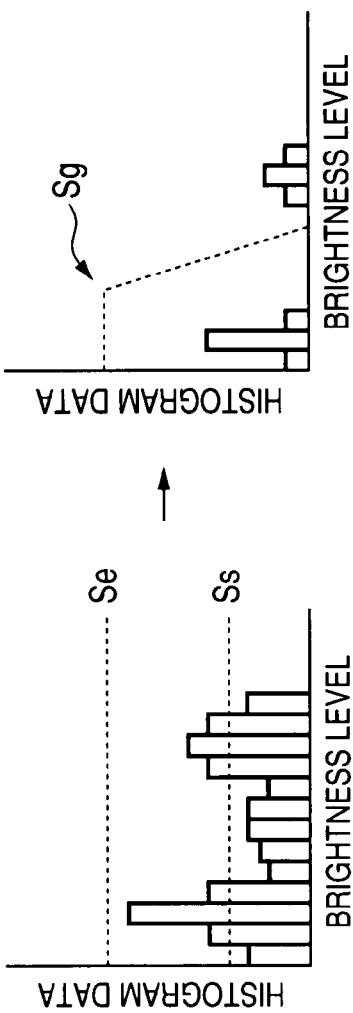

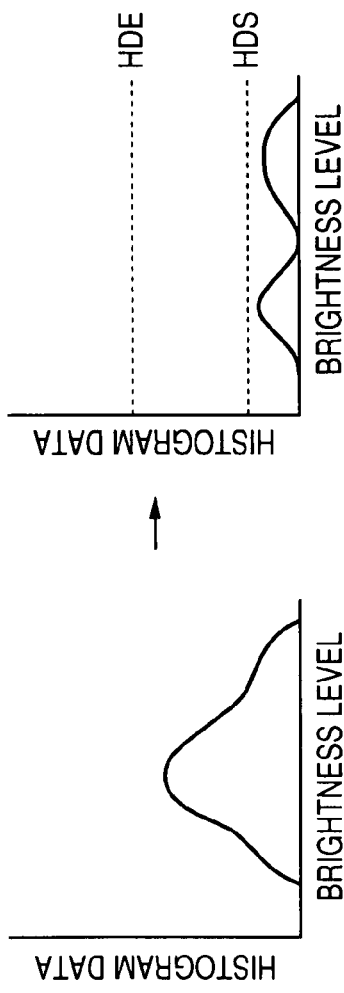
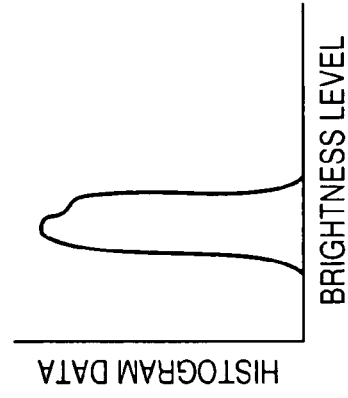
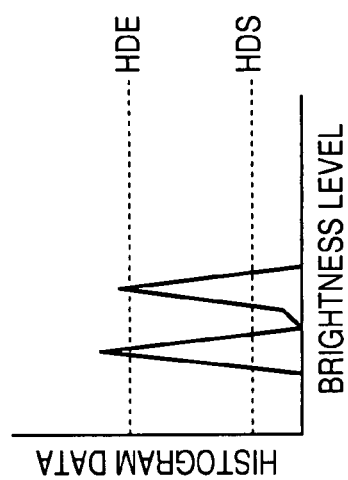
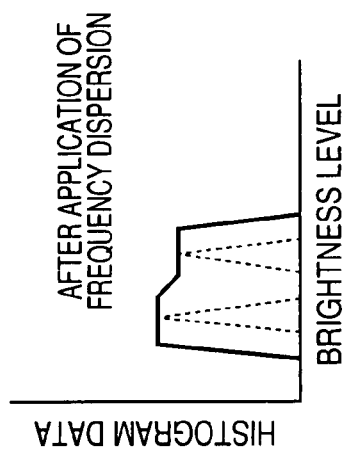
FIG. 8A
FIG. 8B
FIG. 8C
FIG. 8D
FIG. 8E

VIDEO SIGNAL PROCESSING DEVICE AND VIDEO SIGNAL PROCESSING METHOD

CROSS-REFERENCE TO RELATED APPLICATIONS

This application is based upon and claims a priority from Japanese Patent Application No. 2006-144129 filed on May 24, 2006 and from Japanese Patent Application No. 2006-150568 filed on May 30, 2006, the entire contents of which are incorporated herein by reference.

BACKGROUND

1. Field

One embodiment of the invention relates to a video signal processing device and a video signal processing method for performing high band emphasis processing on a video signal based on a brightness histogram.

2. Description of the Related Art

It is known that flat-panel large screen displays have been developed for use in television broadcast receivers in recent years. Such a large screen display performs signal correction processing by using the brightness component of a video signal in order to display a crisp video picture.

JP-A-2006-33469 discloses a configuration where contour correction is made as part of signal correction processing. In the disclosed configuration, the gradation correction characteristic setting part evaluates and determines the pixel frequency distribution of a brightness level histogram and emphasizes the contrast of a gradation correction characteristic in a region at a brightness level with higher pixel frequency. The gradation correction characteristic setting part evaluates and determines the pixel frequency distribution of an edge level histogram and weakens the contrast emphasis effect of a gradation correction characteristic in an almost flat level region with gradation. The problem with JP-A-2006-33469 is that an effective control method with sufficient precision is not disclosed concerning the high band emphasis (sharpness) processing of a video signal as another target of signal correction processing. To be more precise, uniform sharpness is given across the screen but finer high band emphasis processing that corresponds to the brightness level of a particular region of the screen is not available.

In addition, JP-A-2005-175735 discloses a configuration where contour correction is made as part of signal correction processing. Brightness distribution is evaluated and determined in a control circuit 4 and contour correction is weakened in a brightness level region with high distribution frequency in a contour correction circuit 5. As a result, possible noise is suppressed. A problem with the method disclosed in JP-A-2005-175735 is that contour correction is simply weakened over the range of brightness level having for example a larger number of pixels than a predetermined threshold h1 as a method for evaluating/determining the brightness distribution. To be more precise, an effective control method with sufficient precision is not disclosed concerning the contour emphasis, or in other words, the high band emphasis (sharpness) processing of a video signal. For example, in case a steep crest appears in the brightness distribution obtained, the crest indicates a region where a change in the brightness is minute and plain (uniform). There is no way to seek for the possibility of noise reduction effect suited for such a region.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 6A to 6E illustrate an example of high band emphasis processing operation of the high band emphasis correction processing part according to the first embodiment.

FIGS. 8A to 8E illustrate an example of high band emphasis processing operation of the high band emphasis correction processing part according to the second embodiment.

DETAILED DESCRIPTION

Various embodiments of the invention will be described. In general, according to one embodiment of the present invention, there is provided a video signal processing device includes an input unit to which a brightness signal is input, a high band emphasis unit that extracts a first high band component from the brightness signal and outputs an output signal by adding the first high band component to the brightness signal, an acquisition unit that acquires a first histogram data of brightness levels for one frame of the input brightness signal, and a first processing unit that performs a high band emphasis processing on the input brightness signal based on the first histogram data.

First embodiment of the invention will be described with reference to FIGS. 1 to 6E.

Figure 1:
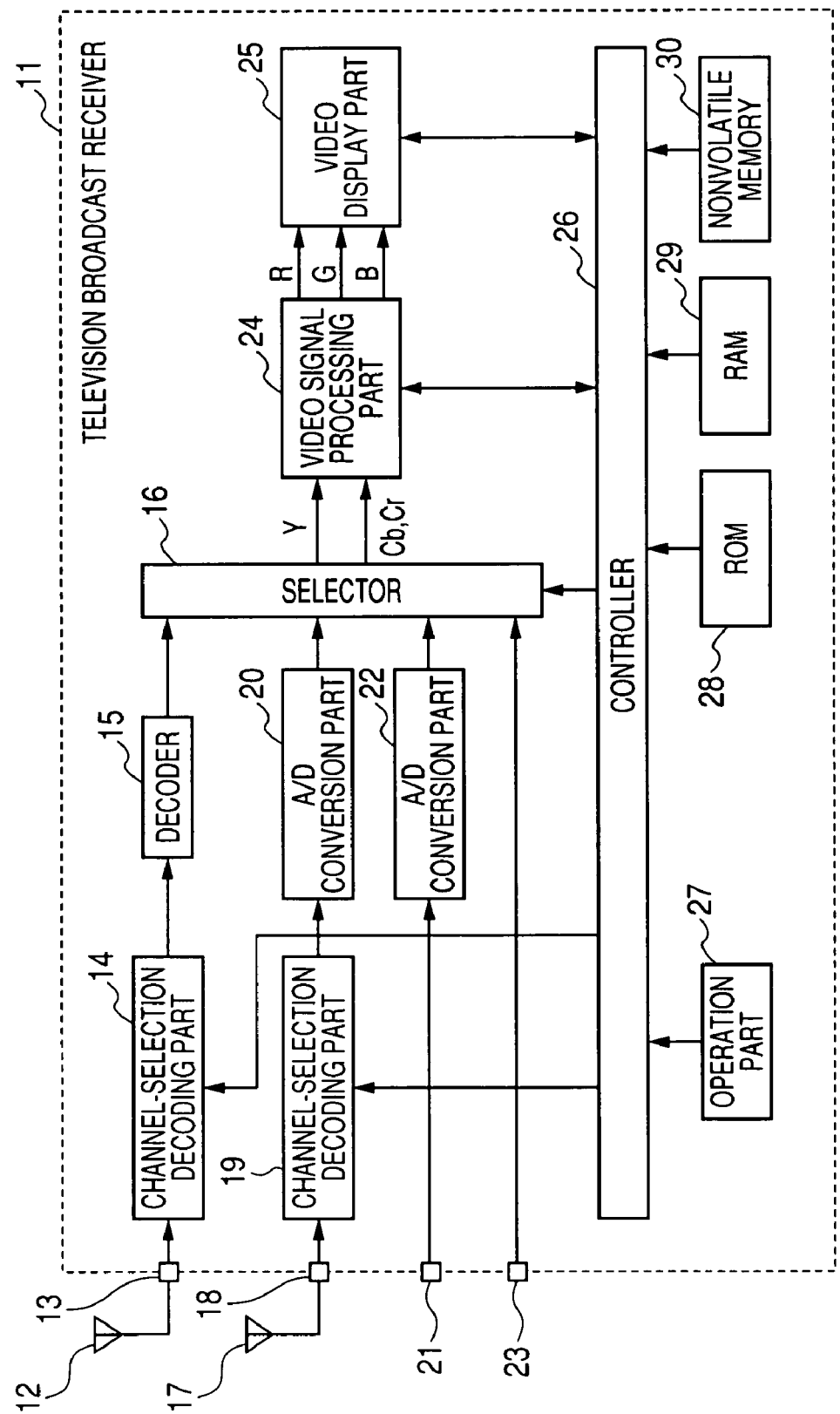
FIG. 1 is an exemplary block diagram illustrating the video signal processing system of a television broadcast device according to an first embodiment of the invention.

FIG. 1 is a schematic view of the video signal processing system of a television broadcast receiver 11.

Digital television broadcast signals received by an antenna 12 that receives digital television broadcasts are supplied to a channel-selection decoding part 14 via an input terminal 13. The channel-selection decoding part 14 selects a broadcast signal on a desired channel among the input digital television broadcast signals, decodes the selected signal and outputs the decoded signal to a decoder 15.

The decoder 15 performs decoding processing on a signal input from the channel-selection decoding part 14 to generate a digital brightness signal Y and a digital chrominance signal Cb/Cr respectively, and outputs these signals to a selector 16.

Analog television broadcast signals received by an antenna 17 for receiving digital television broadcasts are supplied to a channel-selection decoding part 19 via an input terminal 18. The channel-selection decoding part 19 selects a broadcast signal on a desired channel among the input analog television broadcast signals, decodes the selected signal and generates an analog brightness signal Y and an analog chrominance signal Cb/Cr respectively.

The analog brightness signal Y and the analog chrominance signal Cb/Cr generated in the channel-selection decoding part 19 are supplied to an A/D (analog/digital) conversion part 20 and converted to a digital brightness signal Y and a digital chrominance signal Cb/Cr, and output to the selector 16.

The analog brightness signal Y and the analog chrominance signal Cb/Cr supplied to an external input terminal 21 for analog video signals are supplied to an A/D conversion part 22 and converted to a digital signal Y and a chrominance signal Cb/Cr respectively, and output to the selector 16. The digital brightness signal Y and the digital chrominance signal Cb/Cr supplied to an external input terminal 23 for digital video signals are supplied to the selector 16 without being converted.

The selector 16 selects one signal including the digital brightness signal Y and the digital chrominance signal Cb/Cr among a plurality of signals supplied from the decoder 15, A/D conversion parts 20, 22 and external input terminal 23 and supplies the selected signal to a video signal processing part 24. As described above, the configuration up to the selector 16 is functioning as an input unit to which a brightness signal is input.

Although the details are given later, the video signal processing part 24 performs predetermined signal processing on the input digital brightness signal Y and the digital chrominance signal Cb/Cr to generate R (red), G (green) and B (blue) signals.

The R, G, B signals generated in the video signal processing part 24 are supplied to a video display part 25 and subjected to video display. The video display part 25 is a flat-panel display such as a liquid crystal display or a plasma display.

The television broadcast receiver 11 has its operations controlled by a controller 26 in a centralized way including a variety of receive operations. The controller 26 is a microprocessor incorporating a CPU (central processing unit) and controls corresponding system sections so as to reflect an operation instruction contained in the operation information received from an operation part 27 including a remote controller (not shown).

In this case, the controller 26 mainly uses a ROM (read only memory) 28 storing a control program executed by the CPU, a RAM (random access memory) 29 providing a work area for the CPU, and a nonvolatile memory 30 storing a variety of setting information and control information.

Figure 2:
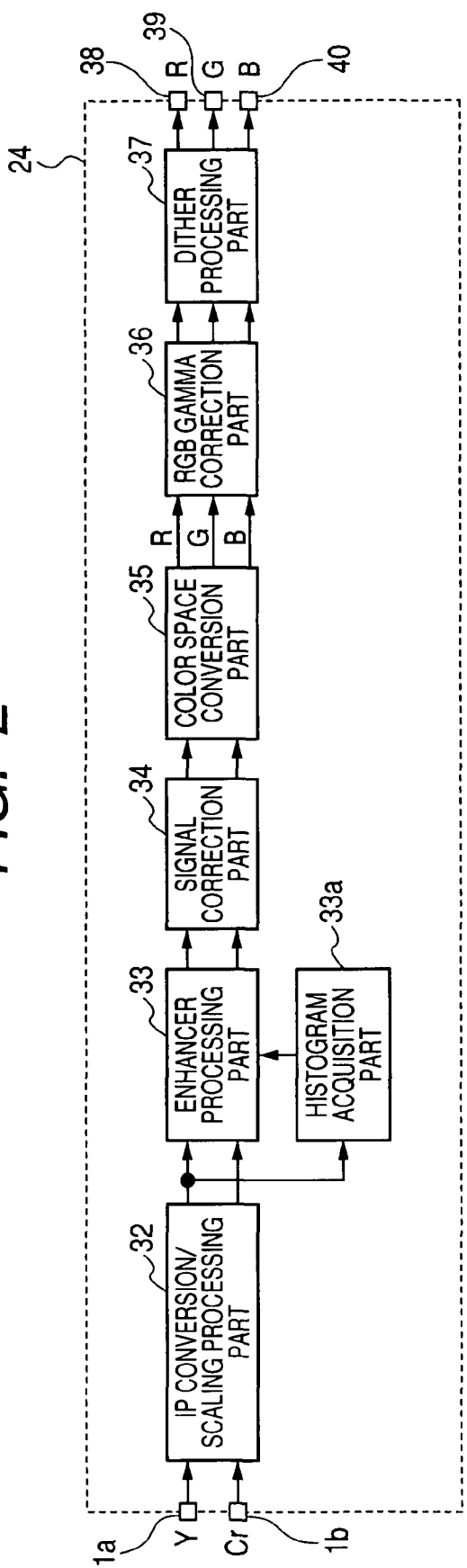
FIG. 2 is an exemplary block diagram illustrating the video signal processing part of the television broadcast device according to the first embodiment.

FIG. 2 shows an example of the video signal processing part 24. The digital brightness signal Y and the digital chrominance signal Cb/Cr are supplied to an IP (interlace progressive) conversion/scaling processing part 32 via input terminals 31a, 31b.

The IP conversion/scaling processing part 32 performs progressive conversion and scaling processing on the brightness signal Y and the chrominance signal Cb/Cr input thereto and outputs the resulting signals to an enhancer processing part 33 for display on the video display part 25 (flat-panel display such as a liquid crystal display or a plasma display).

The enhancer processing part 33 performs enhancer processing such as making steep the leading edge of the brightness signal Y and the chrominance signal Cb/Cr input thereto in vertical and horizontal directions or changing the sharpness of the same signals and outputs the resulting signals to a signal correction part 34. The enhancer processing relates to high band emphasis processing on a video signal as a target of signal correction processing. A histogram acquisition part 33a is connected so as to receive a brightness signal from the IP conversion/scaling processing part 32 and outputs the acquisition result of the histogram of the brightness signal to the enhancer processing part 33.

The signal correction part 34 performs nonlinear correction processing for graduation correction on the input brightness signal Y as well as performs amplitude control processing on the chrominance signal Cb/Cr at the same time with the nonlinear correction processing, and outputs the resulting signals to a color space conversion part 35.

The color space conversion part 35 converts the brightness signal Y and the chrominance signal Cb/Cr input thereto to R, G, B signals and outputs the R, G, B signals to an RGB gamma correction part 36. The RGB gamma correction part 36 performs white balance adjustment on the input R, G, B signals and gamma correction processing for display on the video display part 25 and outputs the resulting signals to a dither processing part 37.

The dither processing part 37 performs compression processing on the input R, G, B signals to convert a high gradation bit representation with increased bit count for enhanced representation to a low gradation bit count corresponding to the video display part 25 and outputs the resulting signals to the video display part 25 via output terminals 38, 39, 40.

Figure 3:
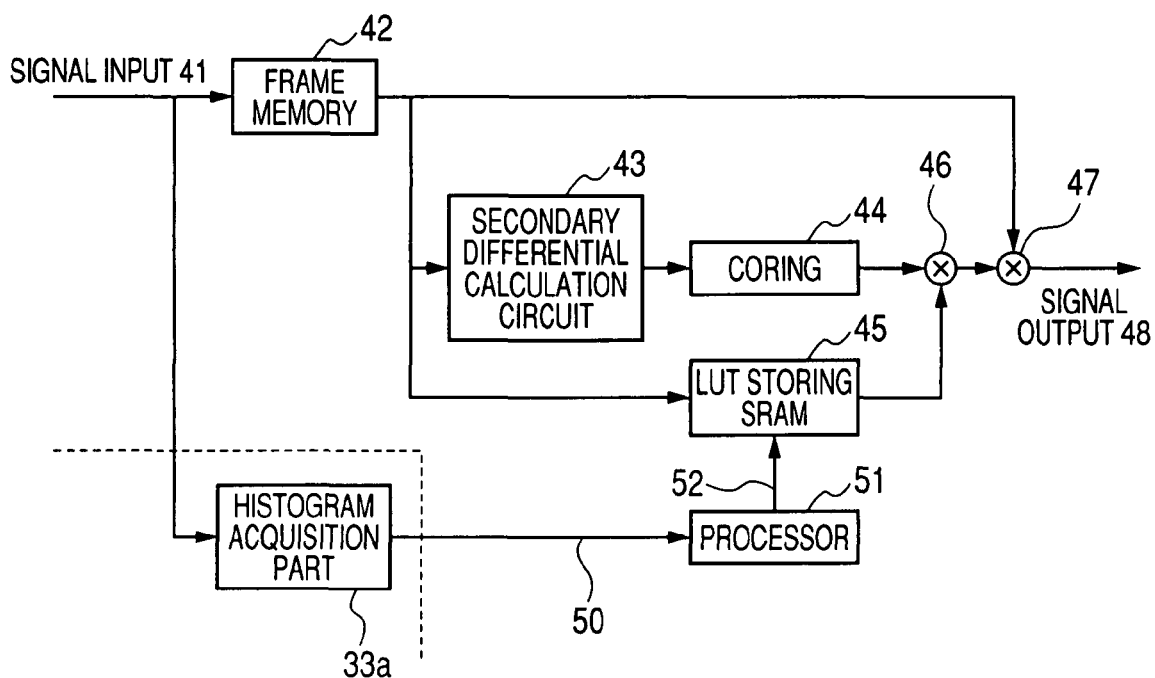
FIG. 3 is an exemplary block diagram illustrating the details of the enhancer processing part of the video signal processing part according to the first embodiment.

FIG. 3 shows an example of the configuration of the enhancer processing part 33 using a brightness signal. The enhancer processing part 33 is connected to a histogram acquisition part 33a functioning as an acquisition unit that acquires histogram data partitioned by the lower left dashed lines. The brightness signal Y output from the IP conversion/scaling processing part 32 connected to the input unit where a brightness signal is input is supplied as a signal input 41 to a frame memory 42 and delayed by one frame. Since it is necessary to acquire a histogram for one frame of an image, a delay by one frame is provided corresponding to the acquisition period. An arbitrary high band component of the delayed signal is extracted by a secondary differential calculation circuit 43, followed by coring processing 44 to delete fine signal components such as noise. An emphasis amount is determined from a value given by an LUT storing SRAM 45 by way of an multiplier 46 and is added by a adder 47 to a frame delay signal as a source signal. The resulting signal is subjected to high band emphasis operation and is output as a signal output 48.

As a process of controlling the high band emphasis amount, the input signal 41 is input to the histogram acquisition part 33a, where the number of pixels at each level is measured. Histogram data of each brightness level is acquired for one frame of the input brightness signal. Resolution of a level should be sufficiently minute for the dynamic range of the input signal 1 (for example, division of 8-bit resolution by 256). When the histogram for one frame is acquired, histogram information 50 is input to a program operating on a processor 51. Then an LUT 52 is calculated as the high band emphasis amount at each level and set to an LUT storing SRAM 45. That is, the LUT storing SRAM 45 is functioning as a processing unit that performs high band emphasis processing on a brightness signal, in particular a creation unit that creates a high band emphasis processing table in cooperation with a processor 51. The adder 47 is functioning as a high band emphasis unit that performs high band emphasis processing. Among the processing section that performs high band emphasis processing on a brightness signal, the processor 51 is functioning as a control section and the LUT storing SRAM 45 is functioning as a conversion section.

Correction of the high band emphasis amount is processed by referring the emphasis amount that is stored in the LUT storing SRAM 45 and correspond the level of a signal delayed by one frame and outputting the emphasis amount to the multiplier 46.

Figure 4:
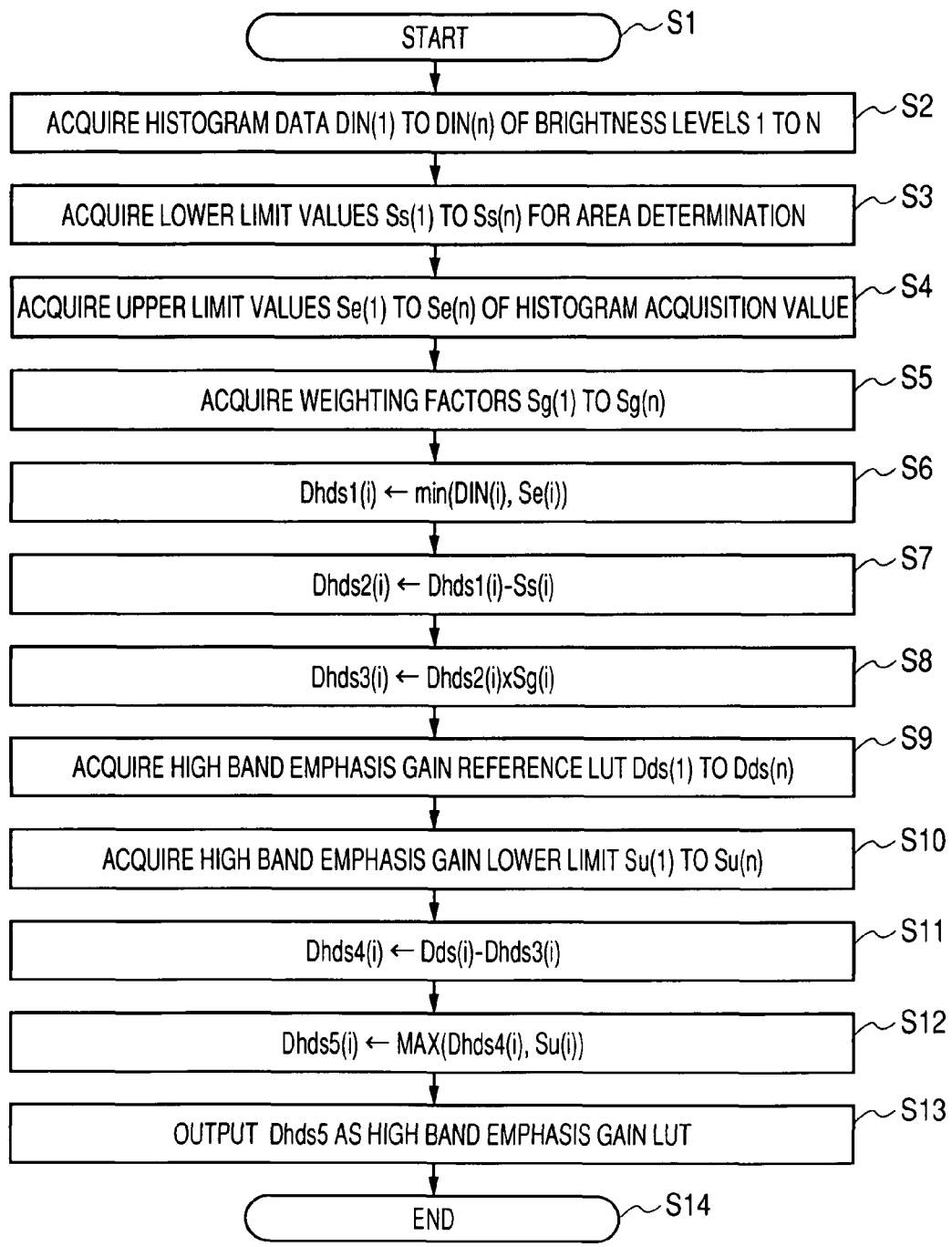
FIG. 4 is an exemplary flowchart illustrating the processing operation of a high band emphasis correction processing part according to the first embodiment.

FIG. 4 shows a flowchart of an example of LUT calculation processing performed on the brightness signal Y. The LUT calculation processing is performed by a high band emphasis correction processing part. The high band emphasis correction processing part may be configured by several components described above. When the processing starts (step S1), the histogram acquisition circuit 9 acquires histogram data DIN(1) to DIN(n) of brightness levels 1 to n respectively in step S2.

Acquisition of the histogram data is made by dividing the dynamic range of a brightness level by n and counting the number of pixels corresponding to the brightness levels 1 to n for one frame of a brightness signal. In this case, the resolution of each of the brightness levels 1 to n should be set minutely enough. For example, in case the resolution of the input video signal is 8 bits, the resolution of a brightness level used to acquire histogram data is also 8 bits.

Figure 5:
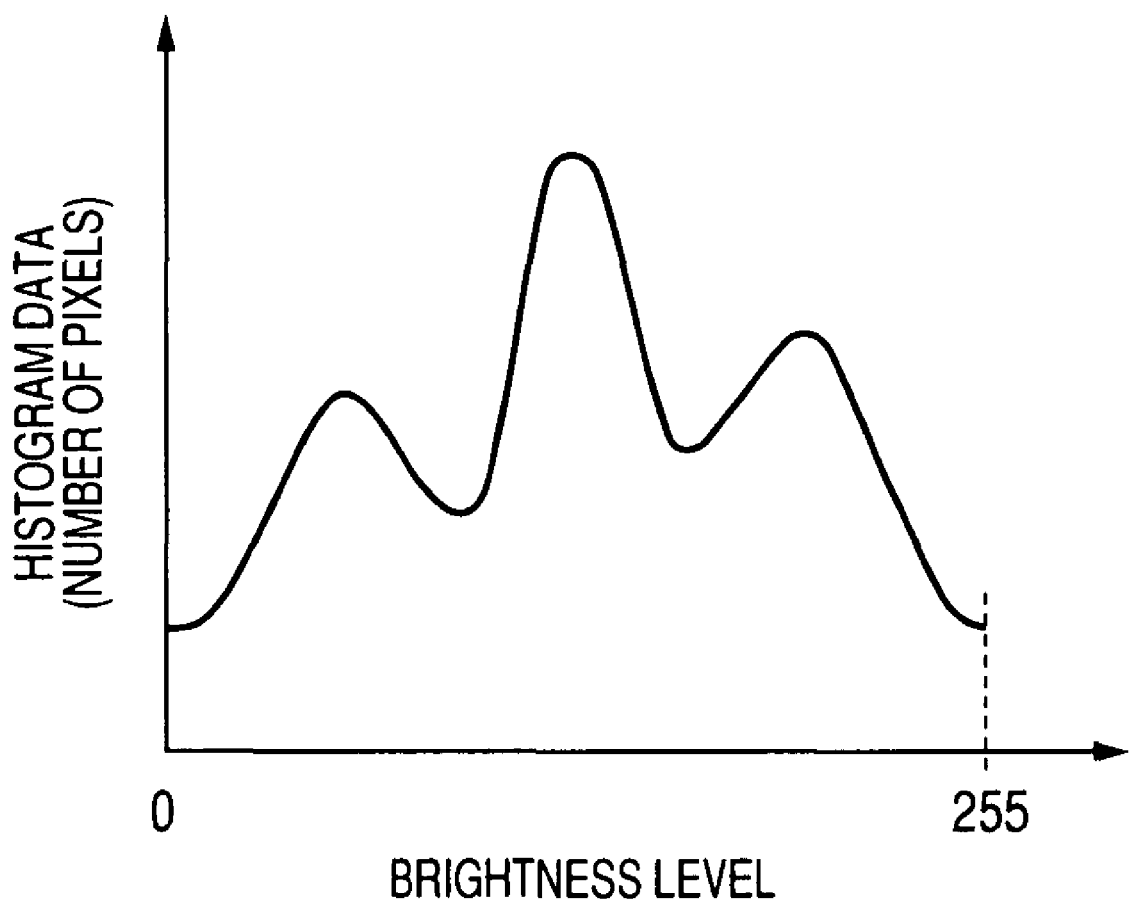
FIG. 5 illustrates an example of one frame of histogram data acquired by the high band emphasis correction processing part according to the first embodiment.

FIG. 5 shows an example of histogram data having a single-frame brightness thus acquired. In this case, the resolution of the brightness level is 8 bits (0-255). In other words, the number of pixels corresponding to each of the 256 brightness levels (0-255) is acquired. The total of all the numbers of pixels at the brightness levels equals the number of the pixels in one frame of an input video signal.

The processor 51 performs frequency dispersion processing on the acquired histogram data DIN(1) to DIN(n) based on the control data supplied from the controller 26. First, in step S3 in FIG. 4, the processor 51 acquires lower limit values Ss(1) to Ss(n) for determining the areas of each of histogram data DIN(1) to DIN(n) of brightness levels 1 to n respectively. Next, in step S4, the processor 51 acquires the upper limit values Se(1) to Se(n) for values of each of histogram data DIN(1) to DIN(n) of brightness levels 1 to n. Next, in step S5, the processor 51 acquires weighting factors Sg(1) to Sg(n) set for each of histogram data DIN(1) to DIN(n) of brightness levels 1 to n.

Then, in step S6, the processor 51 compares the histogram data DIN(i) [i=1-n] with the value Se(i) and obtains whichever is the smaller as Dhds1. This works as limit processing to prevent infinitely large correction on a portion with a large histogram value (a portion that occupies a large area in the screen). That is, the arithmetic operation $Dhds1(i)=\min(DIN(i),Se(i))$ is performed to calculate the value Dhds1(i).

In step S7, the processor 51 subtracts the value Ss(i) from the value Dhds1(i), that is, performs the arithmetic operation $Dhds2(i)=Dhds1(i)-Ss(i)$ to calculate the subtracted value Dhds2(i). Arithmetic operations in steps S6 and S7 are made on each of the brightness levels 1 to n. In case the subtraction result is negative, Dhds2(i) is set to be 0.

In step S8, the processor 51 multiplies the value Dhds2(i) by the value Sg(i), that is, performs the arithmetic operation $Dhds3(i)=Dhds2(i) \times Sg(i)$ to calculate the multiplied value Dhds3(i). Arithmetic operation in step S8 is made on each of the brightness levels 1 to n.

Next, in step S9, the processor 51 acquires the high band emphasis gain reference values Dds(1) to Dds(n) for histogram data DIN(1) to DIN(n) of brightness levels 1 to n. These values work as reference gain set values used when correction using a histogram data is not processed.

Next, in step S10, the processor 51 acquires the high band emphasis gain lower limit values Su(1) to Su(n) for histogram data DIN(1) to DIN(n) of brightness levels 1 to n.

In step S11, the processor 51 subtracts the value Dhds3(i) from the value Dds(i), that is, performs the arithmetic operation $Dhds4(i)=Dds(i)-Dhds3(i)$ to calculate the subtracted value Dhds4(i).

Then, in step S12, the processor 51 compares Dhds4(i) [i=1-n] with the value Su(i) and obtains whichever is the greater as Dhds5(i). This is done for the user to set the correction limit value in order to prevent excessive correction. That is, the arithmetic operation $Dhds5(i)=\mathrm{MAX}(Dhds4(i),Su(i))$ is performed to calculate the value Dhds5(i).

Arithmetic operations in steps S11 and S12 are made on each of the brightness levels 1 to n. In case the subtraction result is negative, Dhds5(i) is set to be 0.

In step S13, Dhds5 described above is output as a result. This serves as an LUT 52 output from the processor 51 and a flow of correcting a high band emphasis effect amount is complete (step S14).

FIGS. 6A to 6E show the high band emphasis processing on a histogram characteristic chart. Each of an upper limit value Se(i) of a histogram acquisition value and a lower limit value Ss(i) for area determination is previously set for each brightness level 1 to n in an arbitrary way. As shown in FIG. 6A, in this example, each of the upper limit value Se(i) and the lower limit value Ss(i) is set to be a constant level as shown in the dashed lines. The bar graph in solid lines represents the histogram data DIN(i). Se(i) is always greater than DIN(i) so that Dhds1(i) equals DIN(i). Dhds2(i) is a value obtained by subtracting Ss(i) from DIN(i) as shown by the bar graph in solid lines in FIG. 6B. In FIG. 6B, the dashed lines show an example where Sg(i) is 1 while i is small, monotonously decreases as i increases until Sg(i) reaches 0, and remains 0 for a larger value of i. FIG. 6C shows corresponding Dhds3(i).

FIG. 6D shows a signal from a frame memory 42 that is added with the signals according to an LUT 52 (−Dhds3(i)) in the adder 47. The resulting high band emphasis signal shown in FIG. 6E is obtained as an output signal 8. In case the solid lines are Dhds4(i) and Su(i) represented by dashed lines is constant as illustrated, the final output is Dhds5(i) that is similar to Dhds4(i) but that employs Su(i) only in the trough portion of Dhds4(i) shown in the Su-employed region 60.

According to the embodiment, a brightness level and an area occupied by the brightness level on the screen are acquired as information. For example, high band emphasis may be inhibited in the presence of a high noise level of the screen attributable to high sensitivity, such as photography took by a dark-field sensitive camera. Adaptive processing may be used: emphasis control may be canceled with a change in brightness or emphasis may be inhibited in case only a part of the screen is the target. Such adaptive processing performs fully automated correction using the histogram data.

There is provided a system that comprises a control unit that controls the gain of high band emphasis (sharpness) based on the brightness level of pixels of an image to be processed and an acquiring unit that acquires a histogram of the brightness of a processed image and acquires the optimum high band emphasis gain of each brightness level based on the acquired histogram.

The fundamental operation is: when it is determined that the brightness at substantially the same level predominantly occupies the screen (occupies a large area of the screen) from the tendency of the obtained histogram, the gain of high band emphasis is lowered below a reference value. Further, by giving separate degrees of effect to the brightness levels, it is possible to suppress the effect of the correction to lower the gain of high band emphasis in a bright portion where detailed representation is desired and enhance the effect of the correction to lower the gain of high band emphasis in a dark portion where noise is more conspicuous than detailed representation.

Next, second embodiment of the invention will be described with reference to FIGS. 1 to 3, 5 and 7 to 8E.

In the second embodiment, a television broadcast receiver 11 has substantially the same configuration as that of the first embodiment.

Figure 7:
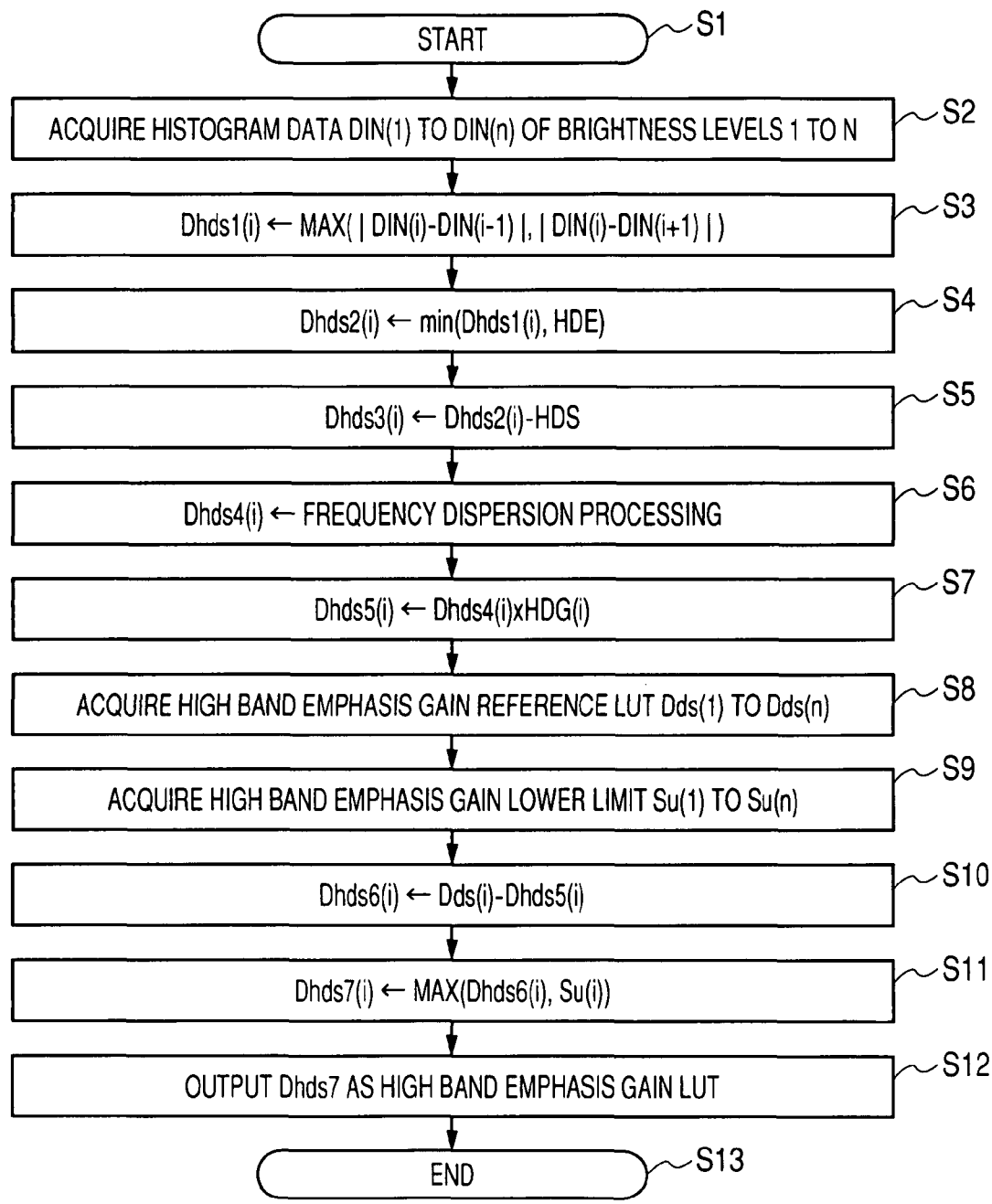
FIG. 7 is an exemplary flowchart illustrating the processing operation of a high band emphasis correction processing part according to the second embodiment.

FIG. 7 shows a flowchart of an example of LUT calculation performed on the brightness signal Y in the second embodiment. That is, when the processing starts (step S1), the histogram acquisition circuit 33a acquires histogram data DIN(1) to DIN(n) of brightness levels 1 to n respectively in step S2.

Acquisition of the histogram data is made by dividing the dynamic range of a brightness level by n and counting the number of pixels corresponding to the brightness levels 1 to n for one frame of a brightness signal. In this case, the resolution of each of the brightness levels 1 to n should be set minutely enough. For example, in case the resolution of the input video signal is 8 bits, the resolution of a brightness level used to acquire histogram data is also 8 bits.

FIG. 5 shows an example of histogram data having a single-frame brightness thus acquired. In this case, the resolution of the brightness level is 8 bits (0-255). In other words, the number of pixels corresponding to each of the 256 brightness levels (0-255) is acquired. The total of all the numbers of pixels at the brightness levels equals the number of the pixels in one frame of an input video signal. In the following description, brightness levels are described as 1 to n as general representation rather than 0 to 255.

The processor 51 performs frequency dispersion processing on the acquired histogram data DIN(1) to DIN(n) based on the control data supplied from the controller 26. First, in step S3 in FIG. 7, the processor 51 calculates the absolute value of each of the difference between a target level i and the previous level (i−1) and the difference between the target level i and the next level (i+1) and acquires whichever is the larger (each of the undefined levels at both ends DIN(0) and DIN(n+1) has a value of 0) as Dhds1(i) in order to detect a plain region where brightness level differences are minute for the histogram data DIN(1) to DIN(n) of the brightness levels 1 to n. Next, in step S4, the processor 51 compares each of Dhds1(1) to Dhds1(n) of brightness levels 1 to n with an upper deviation factor HDE and obtains whichever is the smaller as Dhds2(i). This works as a limiter because too large a value results in excessively large correction amount. Next, in step S5, the processor 51 subtracts a lower deviation factor HDS from each of Dhds2(i) of brightness levels 1 to n to obtain Dhds3(i). In a case where the obtained correction region is smaller than the lower deviation factor HDS, a value of 0 is set as Dhds3(i) and the following processing is skipped.

Then, in step S6, the processor 51 performs frequency dispersion processing to obtain Dhds4. While arithmetic operation examples are given under the following numbers 1 to 4, the correction target region obtained based on a histogram is further expanded. The reason: in case a region is set precisely, even slight changes in the contour of the image results in a change in the high band emphasis level thus presenting a visual drawback. The above-described processing works to suppress such a change. Any of the examples 1 to 4 may be used. As the number becomes larger, the effect to suppress the change in the high band emphasis level is increased. Smaller-effect or larger-effect processing than these examples may be used.

1. A maximum value is acquired as Dhds4(i) among Dhds3(i), Dhds3(i−1), 0.875*Dhds3(i−2), 0.75*Dhds3(i−3), 0.625*Dhds3(i−4), 0.5*Dhds3(i−5), 0.375*Dhds3(i−6), 0.25*Dhds3(i−7), 0.125*Dhds3(i−8), Dhds3(i+1), 0.875*Dhds3(i+2), 0.75*Dhds3(i+3), 0.625*Dhds3(i+4), 0.5*Dhds3(i+5), 0.375*Dhds3(i+6), 0.25*Dhds3(i+7), 0.125*Dhds3(i+8).

2. A maximum value is acquired as Dhds4(i) among Dhds3(i), Dhds3(i−1), Dhds3(i−2), 0.875*Dhds3(i−3), 0.75*Dhds3(i−4), 0.625*Dhds3(i−5), 0.5*Dhds3(i−6), 0.375*Dhds3(i−7), 0.25*Dhds3(i−8), 0.125*Dhds3(i−9), Dhds3(i+1), Dhds3(i+2), 0.875*Dhds3(i+3), 0.75*Dhds3(i+4), 0.625*Dhds3(i+5), 0.5*Dhds3(i+6), 0.375*Dhds3(i+7), 0.25*Dhds3(i+8), 0.125*Dhds3(i+9).

3. A maximum value is acquired as Dhds4(i) among Dhds3(i), Dhds3(i−1), Dhds3(i−2), Dhds3(i−3), 0.875*Dhds3(i−4), 0.75*Dhds3(i−5), 0.625*Dhds3(i−6), 0.5*Dhds3(i−7), 0.375*Dhds3(i−8), 0.25*Dhds3(i−9), 0.125*Dhds3(i−10), Dhds3(i+1), Dhds3(i+2), Dhds3(i+3), 0.875*Dhds3(i+4), 0.75*Dhds3(i+5), 0.625*Dhds3(i+6), 0.5*Dhds3(i+7), 0.375*Dhds3(i+8), 0.25*Dhds3(i+9), 0.125*Dhds3(i+10).

4. A maximum value is acquired as Dhds4(i) among Dhds3(i), Dhds3(i−1), Dhds3(i−2), Dhds3(i−3), Dhds3(i−4), 0.875*Dhds3(i−5), 0.75*Dhds3(i−6), 0.625*Dhds3(i−7), 0.5*Dhds3(i−8), 0.375*Dhds3(i−9), 0.25*Dhds3(i−10), 0.125*Dhds3(i−11), Dhds3(i+1), Dhds3(i+2), Dhds3(i+3), Dhds3(i+4), 0.875*Dhds3(i+5), 0.75*Dhds3(i+6), 0.625*Dhds3(i+7), 0.5*Dhds3(i+8), 0.375*Dhds3(i+9), 0.25*Dhds3(i+10), 0.125*Dhds3(i+11).

In step S7, the processor 51 multiplies the value Dhds4(i) by the value HDG(i), that is, performs the arithmetic operation $$Dhds5(i)=Dhds4(i) \times HDG(i)$$

to calculate the multiplied value Dhds5(i). Arithmetic operation in step S8 is made on each of the brightness levels 1 to n. A gain is set to determine the final correction amount. The gain holds a data amount for the brightness levels 1 to n. HDG(i) is a value between 0 and 1 corresponds to the highest effect while 0 no effect. In an exemplary configuration, the user may select on a device menu between several stages such as High, Middle, Low and Off.

Next, in step S8, the processor 51 acquires the high band emphasis gain reference values Dds(1) to Dds(n) for histogram data DIN(1) to DIN(n) of brightness levels 1 to n. These values work as reference gain set values used when correction using a histogram data is not processed.

Next, in step S9, the processor 51 acquires the high band emphasis gain lower limit values Su(1) to Su(n) for histogram data DIN(1) to DIN(n) of brightness levels 1 to n.

In step S10, the processor 51 subtracts the value Dhds5(i) from the value Dds(i), that is, performs the arithmetic operation $$Dhds6(i)=Dds(i)-Dhds5(i)$$

to calculate the subtracted value Dhds6(i). In this step, the high band emphasis gain reference values are corrected based on the values obtained from the histogram data.

Then, in step S11, the processor 51 compares Dhds6(i) [i=1−n] with the value Su(i) and obtains whichever is the greater as Dhds7(i). That is, the arithmetic operation $$Dhds7(i)=MAX(Dhds6(i),Su(i))$$

is performed to calculate the value Dhds7($i$). This is done for the user to set the correction limit value in order to prevent excessive correction.

Arithmetic operations in steps S10 and S11 are made on each of the brightness levels 1 to n. In case the subtraction result is negative, Dhds7($i$) is set to be 0.

In step S12, Dhds7 described above is output as a result. This serves as an LUT 52 output from the processor 51 and a flow of correcting a high band emphasis effect amount is complete (step S13).

FIGS. 8A to 8E show the high band emphasis processing on a histogram characteristic chart. As shown in FIG. 8A, for the histogram data DIN(1) to DIN(n) for the input signal in which pixels are widely distributed for each of brightness levels 1 to n, the difference Dhds1($i$) that is an inclination in an absolute value of the histogram data DIN(i) is obtained as shown by the solid lines in FIG. 8B. In this example, Dhds1($i$) is always smaller than HDE so that Dhds2($i$) is on the same line as Dhds1($i$). Dhds2($i$) is always smaller than HDS so that the value of Dhds3($i$) is always 0. Thus, the value of Dhds4($i$) is always 0 and relaxation of effect of the high band emphasis based on the high band emphasis gain reference values Dds(1) to Dds(n) does not take place.

In FIG. 8C, unlike in FIG. 8A, the histogram data DIN(1) to DIN(n) for the input signal in which pixels are narrowly distributed for each of brightness levels 1 to n is shown. Accordingly, the difference Dhds1($i$) that is an inclination in an absolute value of the DIN(i) shown by the solid lines in FIG. 8D is obtained. In this example, Dhds1($i$) is truncated by HDE, HDS is subtracted from Dhds2($i$), and Dhds3($i$) is obtained as shown by the dashed lines in FIG. 8E. Dhds4($i$) calculated from Dhds3($i$) appears as the solid lines in FIG. 8E. This is the correction to broaden the range of a steep edge so as to prevent an abrupt change in sharpness as seen by the viewer. Effect of the high band emphasis based on the high band emphasis gain reference values Dds(1) to Dds(n) is relaxed by the amount of Dhds4($i$).

According to the embodiment, a brightness level and an area occupied by the brightness level on the screen are acquired as information. For example, a target portion in which a noise is included on a plain image with a large area at a specific brightness level, for example a photographed image of a blue sky, may be detected and high band emphasis on the target portion may be limited. By calculating both ends of a crest in the brightness distribution (lower and upper end at the input brightness level) and limiting the high band emphasis gain for the range, it is possible to avoid emphasis of a noise component on the plain image (such as a blue sky, corner to corner).

It is thus possible to make visually inconspicuous the noise on a blue sky portion by avoiding emphasis on the noise. Further, coring processing via reversed addition may be performed.

There is provided a system that comprises a control unit that controls the gain of high band emphasis (sharpness) based on the brightness level of pixels of an image to be processed and an acquiring unit that acquires a histogram of the brightness of a processed image and acquires the optimum high band emphasis gain of each brightness level based on the acquired histogram.

The fundamental operation is: when it is determined that the brightness at substantially the same level predominantly occupies the screen (occupies a large area of the screen) from the tendency of the obtained histogram, the gain of high band emphasis is lowered below a reference value.

The invention is not limited to the foregoing embodiment but may be embodied by a variety of modifications to the components without departing from the spirit and scope of the invention. By combining plural components disclosed in the foregoing embodiment as required, variations of the invention may be formed. For example, some of the components indicated in the embodiment may be deleted. Or, components related to different embodiments may be combined as required.

What is claimed is:

1. A video signal processing device comprising:
   an input unit to which a brightness signal is input;
   a high band emphasis unit that extracts a first high band component from the brightness signal and outputs an output signal by adding the first high band component to the brightness signal;
   an acquisition unit that acquires a first histogram data of brightness levels for one frame of the input brightness signal; and
   a first processing unit that performs a high band emphasis processing on the input brightness signal based on the first histogram data, the first processing unit including a high band emphasis table creation unit that outputs a second histogram data by performing a frequency conversion processing on the first histogram data, corrects a high band emphasis amount preset for each of the brightness levels based on the second histogram data and stores the high band emphasis amount into an LUT.

2. The video signal processing device according to claim 1, wherein the first processing unit comprises:
   a control unit that controls an effect of the high band emphasis unit for each of the brightness levels of the input brightness signal; and
   a conversion unit that determines an effect amount of the high band emphasis unit for each of the brightness levels of the input brightness signal.

3. The video signal processing device according to claim 1, wherein the high band emphasis table creation unit comprises:
   a subtraction section that outputs third histogram data by subtracting preset threshold values preset for each of the brightness levels from the second histogram data;
   a multiplication section that outputs fourth histogram data by multiplying the third histogram data by a weighting factor preset for each of the brightness levels; and
   a correction section that corrects the high band emphasis amount based on the fourth histogram data.

4. The video signal processing device according to claim 3, wherein the subtraction section outputs the zero for each of the brightness levels in a case where a subtraction result is a negative value.

5. The video signal processing device according to claim 1, further comprising:
   a second processing section that receives a delayed brightness signal for the brightness signal, extracts a second high band component from the delayed brightness signal and deletes a fine signal component from the second high band component.

6. The video signal processing device according to claim 1, wherein the high band emphasis table creation unit comprises:
   a difference processing section that outputs third histogram data by performing a difference processing on the second histogram data;
   a subtraction section that outputs fourth histogram data by subtracting preset threshold values preset for each brightness levels from the third histogram data;

a multiplication section that outputs fifth histogram data by multiplying the fourth histogram data by a weighting factor preset for each of the brightness levels; and a correction section that corrects the high band emphasis amount based on the fifth histogram data.

7. The video signal processing device according to claim 6, wherein the subtraction section outputs the zero for each of the brightness levels in a case where a subtraction result is a negative value.

8. The video signal processing device according to claim 6, wherein the table creation unit comprises:

a frequency dispersion section that performs a frequency dispersion processing on each of values of the third histogram data prior to the processing of the multiplication in the multiplication section.

9. A video signal processing method comprising:

(a) inputting one frame of a brightness signal;

(b) acquiring histogram data of brightness levels for the brightness signal;

(c) correcting the histogram data by:

(c-1) performing frequency conversion processing on the histogram data to disperse each of the values into a predetermined range of the brightness levels if each of the values have a value greater than a predetermined value;

(d) creating a high band emphasis processing table for performing a high band emphasis processing on the brightness signal based on the histogram data; and (e) performing the high band emphasis processing on the brightness signal based on the high band emphasis processing table.

10. The video signal processing method according to claim 9, wherein the correcting step of (c) comprises:

(c-2) subtracting threshold values preset for each of the brightness levels from the histogram data; and (c-3) multiplying the histogram data by a weighting factor preset for each of the brightness levels.

11. The video signal processing method according to claim 10, wherein zero is output for each of the brightness levels if a result of the subtracting is a negative value.

12. The video signal processing method according to claim 9, further comprising:

(f) receiving a delayed brightness signal acquired by delaying the brightness signal;

(g) extracting a high band component from the delayed brightness signal; and (h) deleting a fine signal component from the high band component.

13. The video signal processing method according to claim 9, wherein the correcting step of (c) comprises:

(c-2) subtracting threshold values preset for each of the brightness levels from the histogram data;

(c-3) performing a frequency dispersion processing on values of each of the brightness levels of the histogram data; and (c-3) multiplying the histogram data by a weighting factor preset for each of the brightness levels.

14. A video signal processing device comprising:

an input unit that receives one frame of a brightness signal;

a first calculation unit that extracts a high band component from the brightness signal and calculates an operation amount for a high band emphasis processing based on the high band component;

an acquisition unit that acquires a first histogram data of brightness levels for the brightness signal;

a second calculation unit that calculates a correction amount for the operation amount based on the first histogram data;

a determination unit that determines an high band emphasis amount by correcting the operation amount based on the correction amount; and a high band emphasis unit that processes the high band emphasis processing based on the high band emphasis amount.

15. The video signal processing device according to claim 14, wherein the second calculation unit comprises:

a control unit that controls a calculation of the correction amount for each of the brightness levels of the brightness signal; and a storage unit that stores the correction amount.

16. The video signal processing device according to claim 14, wherein the second calculation unit comprises:

a frequency conversion unit that outputs a second histogram data by performing a frequency conversion processing on the first histogram data;

a table creation unit that creates a correction amount table that indicates the correction amount; and a storage unit that stores the correction amount table.

17. The video signal processing device according to claim 16, wherein the table creation unit comprises:

a subtraction section that outputs third histogram data by subtracting preset threshold values preset for each of the brightness levels from the second histogram data;

a multiplication section that outputs fourth histogram data by multiplying the third histogram data by a weighting factor preset for each of the brightness levels; and a correction amount calculation section that calculates the correction amount based on the fourth histogram data.

18. The video signal processing device according to claim 17, wherein the subtraction section outputs the zero for each of the brightness levels in a case where a subtraction result is a negative value.

19. The video signal processing device according to claim 14, further comprising:

a coring unit that deletes a fine signal component included in the high band component extracted by the first calculation unit.

* * * * *